United States Patent [19]

Kambe et al.

[11] Patent Number: 5,481,149
[45] Date of Patent: Jan. 2, 1996

[54] HOMOPOLAR DYNAMOELECTRIC MACHINE

[75] Inventors: Yoshitaka Kambe, Toyota; Tamio Shinozawa, Anjo, both of Japan

[73] Assignee: Toyota Jidosha Kabushiki Kaisha, Japan

[21] Appl. No.: 338,753

[22] Filed: Nov. 10, 1994

[30] Foreign Application Priority Data

Nov. 12, 1993 [JP] Japan .................... 5-283573

[51] Int. Cl.⁶ .................................................. H02K 31/00
[52] U.S. Cl. ........................ 310/178; 310/232; 310/248; 310/268
[58] Field of Search ..................... 310/178, 219, 310/114, 232, 268, 208, 248, 261; 322/48; 318/253

[56] References Cited

U.S. PATENT DOCUMENTS

| | | | |
|---|---|---|---|
| 3,513,340 | 5/1970 | Appleton | 310/178 UX |
| 3,586,894 | 6/1971 | Mueller | 310/178 |
| 3,916,235 | 10/1975 | Masar | 310/219 |
| 4,514,653 | 4/1985 | Batni | 310/178 |
| 5,278,470 | 1/1994 | Neag | 310/178 |

FOREIGN PATENT DOCUMENTS

| | | | |
|---|---|---|---|
| 1394901 | 7/1965 | France . | |
| 1409732 | 12/1965 | France . | |
| 1557690 | 2/1969 | France . | |
| 2276725 | 1/1976 | France | 310/178 |
| 1116810 | 11/1961 | Germany . | |
| 49-129103 | 3/1974 | Japan . | |
| 1343275 | 1/1974 | United Kingdom | 310/178 |

OTHER PUBLICATIONS

European Search Report dated Feb. 23, 1995 (2 pages).
Communication dated Mar. 1, 1995 (1 page).

Primary Examiner—R. Skudy
Attorney, Agent, or Firm—Finnegan, Henderson, Farabow, Garrett & Dunner

[57] ABSTRACT

A homopolar dynamoelectric machine comprises a solenoid coil for generating a magnetic field, having a cavity formed around an axis thereof. A rotating shaft, which constitutes a rotor, is rotatably provided in the cavity about the axis. A circular plate, which also constitutes the rotor, is integrally fixed on the shaft. A rotating body is rotatably supported by the plate about an axis of the shaft. A first electric current path, through which an electric current can pass from a proximal portion to a distal portion of the rotor, is integrally provided in, for example, the plate. A second electric current path, through which an electric current can pass from a distal portion to a proximal portion of the rotor, is integrally provided in the rotating body. The first and second paths are electrically connected in series, and are adapted to be electrically connected to a power supply in order to supply a direct current to these paths.

20 Claims, 10 Drawing Sheets

HOMOPOLAR DYNAMOELECTRIC MACHINE

BACKGROUND OF THE INVENTION

1. Field of the Invention

The present invention relates to a homopolar dynamoelectric machine.

2. Description of the Related Art

In a known homopolar dynamoelectric machine, the dynamoelectric machine is provided with a solenoid coil for excitation, having a cylindrical cavity formed around an axis thereof; and a rotor, located within the cavity, rotatable about the axis of the coil. The dynamoelectric machine is further provided with a first electric current path extending from a proximal portion to a distal portion of the rotor; and a second electric current path extending from a distal portion to a proximal portion of the rotor. The second path is connected to the first path in series (see Japanese Unexamined Patent Publication No. 49-129103). In this dynamoelectric machine, on a surface which defines the cavity, that is, for example, an inner surface of the coil holder for holding the solenoid coil, there is fixed a stationary member extending radially inwardly from the inner surface. The first path may be formed in the rotor, and the second may be formed in the stationary member.

On the distal end of the stationary member, a nozzle for injecting an electroconductive liquid toward the distal end of the first path is provided, and an electrical connection between the distal ends of the first and second paths is thereby obtained. However, when the distance between the rotor and the stationary member becomes smaller than suitable, an undesirable contact between the rotor and the stationary member may occur. On the other hand, when the distance is larger than suitable, it is difficult to ensure an electrical connection between the first end second paths at their distal ends. Therefore, in the dynamoelectric machine described above, an accurate location of the rotor and the stationary member is required. The rotor and the stationary member, however, are located in the cavity of the solenoid coil, which cavity is relatively small, and thus it is difficult to locate these elements in the inner space accurately so as to make the distance between the rotor and the stationary member suitable. As a result, an assembly of the homopolar dynamoelectric machine is difficult, and it is difficult to ensure an electrical good connection between the first and second paths.

SUMMARY OF THE INVENTION

An object of the present invention is to provide a homopolar dynamoelectric machine capable of being easily assembled, while ensuring an electrical good connection between the first and second paths.

The present invention provides a homopolar dynamoelectric machine comprising: a solenoid coil for excitation, having a cylindrical cavity formed around an axis thereof; a rotor, provided in the cavity, rotatable about the axis of the coil, having a proximal portion and a distal portion; a rotating body, rotatably supported by the rotor about an axis of the rotor, the rotatable body extending from the proximal portion to the distal portion of the rotor; a first electric current path extending from the proximal portion to the distal portion of the rotor, through which an electric current passes from the proximal portion to the distal portion of the rotor; and a second electric current path extending from the distal portion to the proximal portion of the rotor, through which an electric current passes from the distal portion to the proximal portion of the rotor, the second path being electrically connected in series with the first path, and the first and second paths being adapted to be electrically connected to a power supply in order to supply a direct current to these paths; wherein the rotor comprises one of the first and second paths, and the rotating body comprises the other of the first and second paths.

The present invention may be more fully understood from the description of preferred embodiments of the invention, as set forth below, together with the accompanying drawings.

DESCRIPTION OF THE PREFERRED EMBODIMENTS

In the embodiments described below, a homopolar dynamoelectric machine 1 according to the present invention is used as a homopolar motor. Alternatively, the dynamoelectric machine may be used as a homopolar generator.

Figure 1:
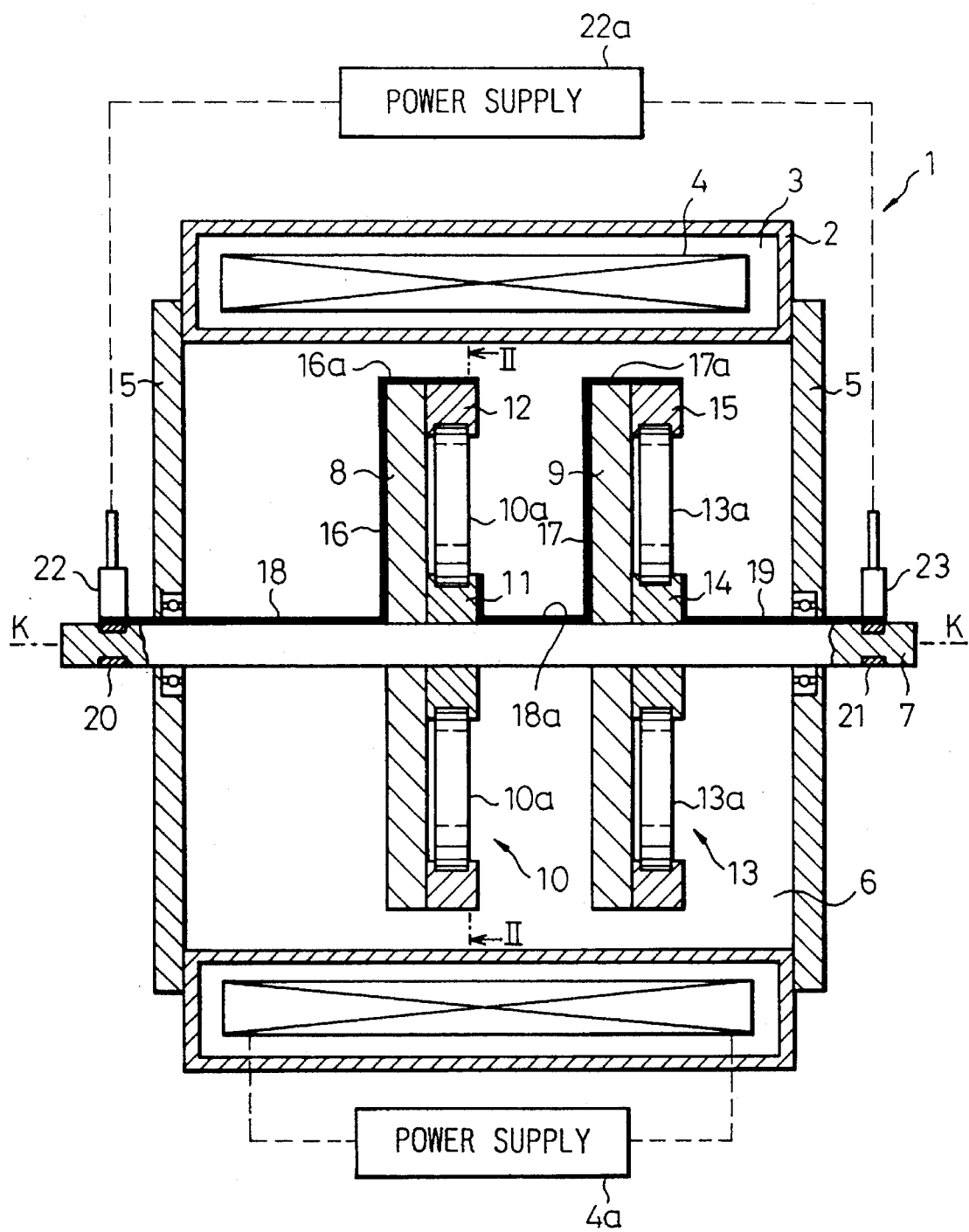
FIG. 1 is a cross-sectional side view of a homopolar dynamoelectric machine according to a first embodiment of the present invention.

FIG. 1 shows a cross-sectional side view of a homopolar motor 1 according to a first embodiment of the present invention. Referring to FIG. 1, the reference numeral 2 designates a coil holder, and 3 designates a coil compartment in the form of annular cavity defined in the coil holder 2; 4 designates a solenoid coil arranged in the coil compartment 3, 5 designates side walls fixed on the respective side of the coil holder 2, and formed of an insulating material, and 6 designates a cavity, defined by the inner surface of the coil holder 2, around an axis K—K of the coil 4. In this embodiment, the solenoid coil 4 is a superconducting coil, and thus, to maintain the superconductivity of the coil 4, the coil compartment 3 is filled with liquid helium, for example. The coil 4 is supplied with electric power from a dc power supply 4a.

As shown in FIG. 1, a rotating shaft 7 is arranged on the axis K—K within the cavity 6. The shaft 7 is supported rotatably about the axis K—K, by bearings provided in the side walls 5, and thus the axis of the shaft 7 conforms to that of the coil K—K, in this embodiment. On the shaft 7, within the cavity 6, generally circular plates 8 and 9, which extend in the radial direction from the shaft 7, are integrally provided. In this embodiment, the shaft 7 and the plates 8 and 9 constitute a rotor, and are formed of an insulating material, such as resin. Further, the shaft 7 is adapted to be connected to an input shaft of a driven machine (not shown), and thus can act as an output shaft of the motor 1.

Figure 2:
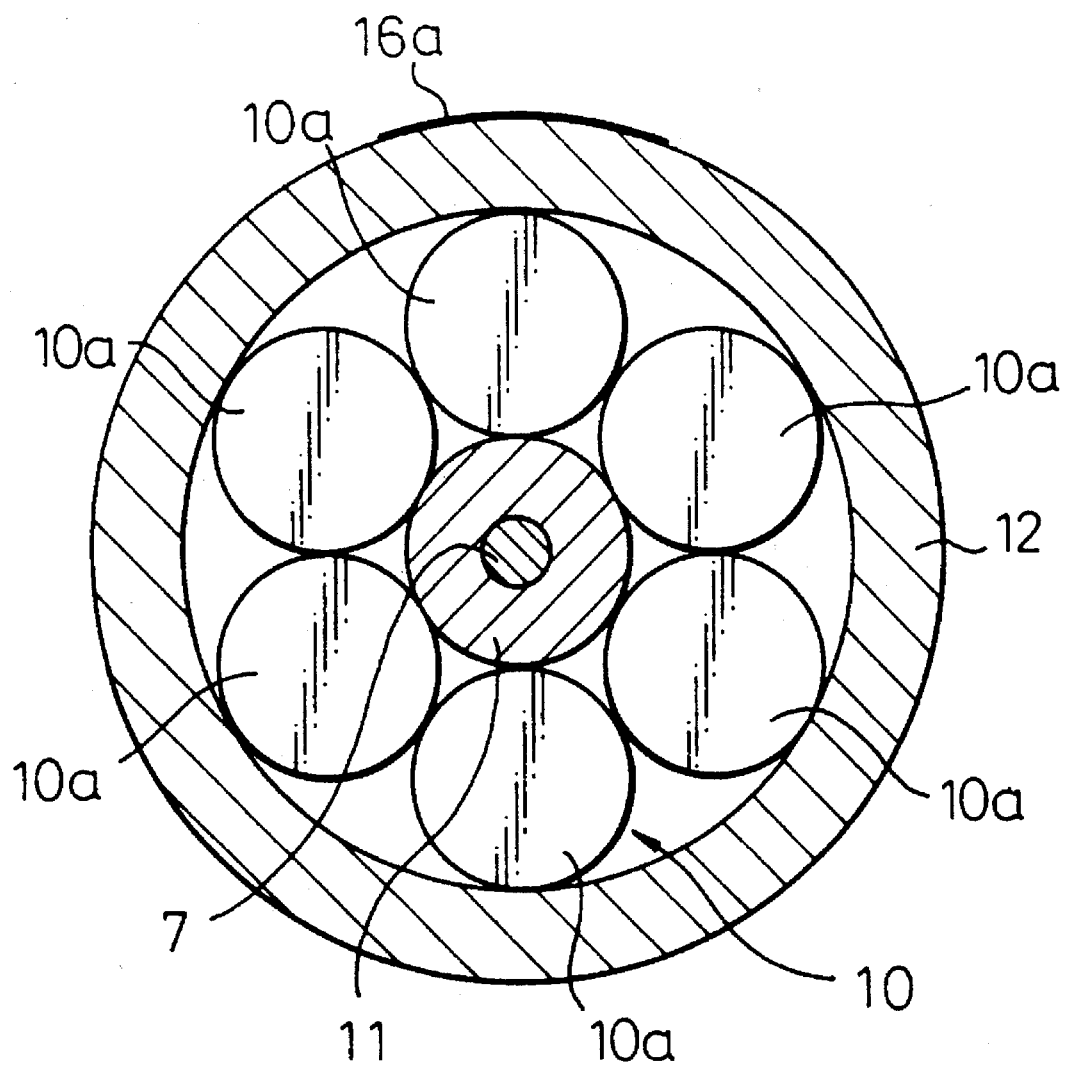
FIG. 2 is a cross-sectional view of a rotor, taken along the line II–II in FIG. 1.

As shown in FIGS. 1 and 2, the plate 8 is provided with a rotating body 10. In this embodiment, the rotating body 10 comprises a plurality of rotating members 10a, each of which is a generally circular plate. The rotating members 10a are supported by an annular proximal support 11 and an annular distal support 12. The proximal support 11 is integrally fixed to the proximal portion of the plate 8, and the distal support 12 is integrally fixed to the distal portion of the plate 8. Therefore, the rotating members 10a are supported by the plate 8. Further, the rotating members 10a are guided by the supports 11 and 12, and thereby these members 10a can rotate about the axis K—K, relative to the plate 8, while contacting the supports 11 and 12.

In the same manner, the plate 9 is provided with a rotating body 13. The rotating body 13 comprises a plurality of rotating members 13a, each of which is a generally circular plate. The rotating bodies 13 are supported by an annular proximal support 14, and an annular distal support 15. The support 14 is integrally fixed to a proximal portion of the plate 9, and the support 15 is integrally fixed to a distal portion of the plate 9. Therefore, the rotating members 13a are supported by the plate 9. Further, the rotating members 13a are guided by the supports 14 and 15, and thereby these members 13a can rotate about the axis K—K, relative to the plate 9, while contacting the supports 14 and 15. The rotating members 10a and 13a, and the supports 11, 12, 14 and 15 are formed of an electroconductive material, such as a beryllium-copper alloy.

The circular plate 8 is integrally provided with an electric current path 16 extending from a proximal portion to a distal portion thereof. The distal end of the path 16 is electrically connected to the support 12, via an axially extending path 16a parallel to the axis K—K. The support 12 is electrically connected to the rotating members 10a by contact therewith, and, in turn, the rotating members 10a is electrically connected to the support 11 by contact therewith. In this embodiment, the path 16 constitutes a first electric current path, through which an electric current passes from a proximal portion to a distal portion of the rotor, and the rotating body 10 constitutes a second electric current path, through which an electric current passes from the distal portion to the proximal portion of the rotor. Further, as shown, the first and second electric currents paths are connected, in series, at the distal portion of the rotor.

In the same manner, the circular plate 9 is integrally provided with an electric current path 17 extending from a proximal portion to a distal portion thereof. The distal end of the path 17 is electrically connected to the support 15, via an axially extending path 17a parallel to the axis K—K. The support 15 is electrically connected to the rotating members 13a by contact therewith. The rotating members 13a are also electrically connected to the support 14 by contact therewith. These electric current paths are also electrically connected, in series, at the distal portion of the rotor.

The path 17 constitutes another first electric current path, and the rotating body 13 constitutes another second electric current path, and thus, in this embodiment, two pairs of the first and second paths are provided. Further, in the embodiment shown, supports 11, 12, 14 and 15 also constitute the rotor.

In this embodiment, the first and second paths extend substantially perpendicular to the axis K—K.

As shown in FIG. 1, the proximal end of the electric current path 16 of the plate 8 is electrically connected to an axially extending path 18. The support 11 of the plate 8 is electrically connected to the proximal end of the path 17 of the plate 9 by an axially extending path 18a, and thus the path 16 and the path constituted by rotating body 10 provided in the plate 8, and the path 17 and the path constituted by rotating body 13 provided in the plate 9 are connected in series. The support 14 of the plate 9 is electrically connected to an axially extending path 19. These paths 18, 18a, and 19 are integrally attached to the shaft 7 and extend parallel to the axis K—K. The axially extending paths 18 and 19 extend outside of the cavity 6, and electrically connected to respective slip-rings 20 and 21, provided on the shaft 7 outside of the cavity 6.

A collecting brush 22 is electrically connected to the positive side of a dc power supply 22a and always engages with the slip-ring 20. Thus the electric connection between the positive side of the power supply 22a and the path 18 is always ensured, even when the shaft 7 is rotating. On the other hand, a collecting brush 23 is electrically connected to the negative side of the power supply 22a and always engages with the slip-ring 21. Thus the electric connection between the negative side of the power supply 22a and the path 18 is always ensured. In this embodiment, each of the paths 16, 16a, 17, 17a, 18, 18a, 19 is formed by a tape or a strip of copper foil. Alternatively, these paths may be formed of, for example, a wire or a galvanized layer of a good electroconductive material, such as copper, aluminum, or the like.

Figure 3:
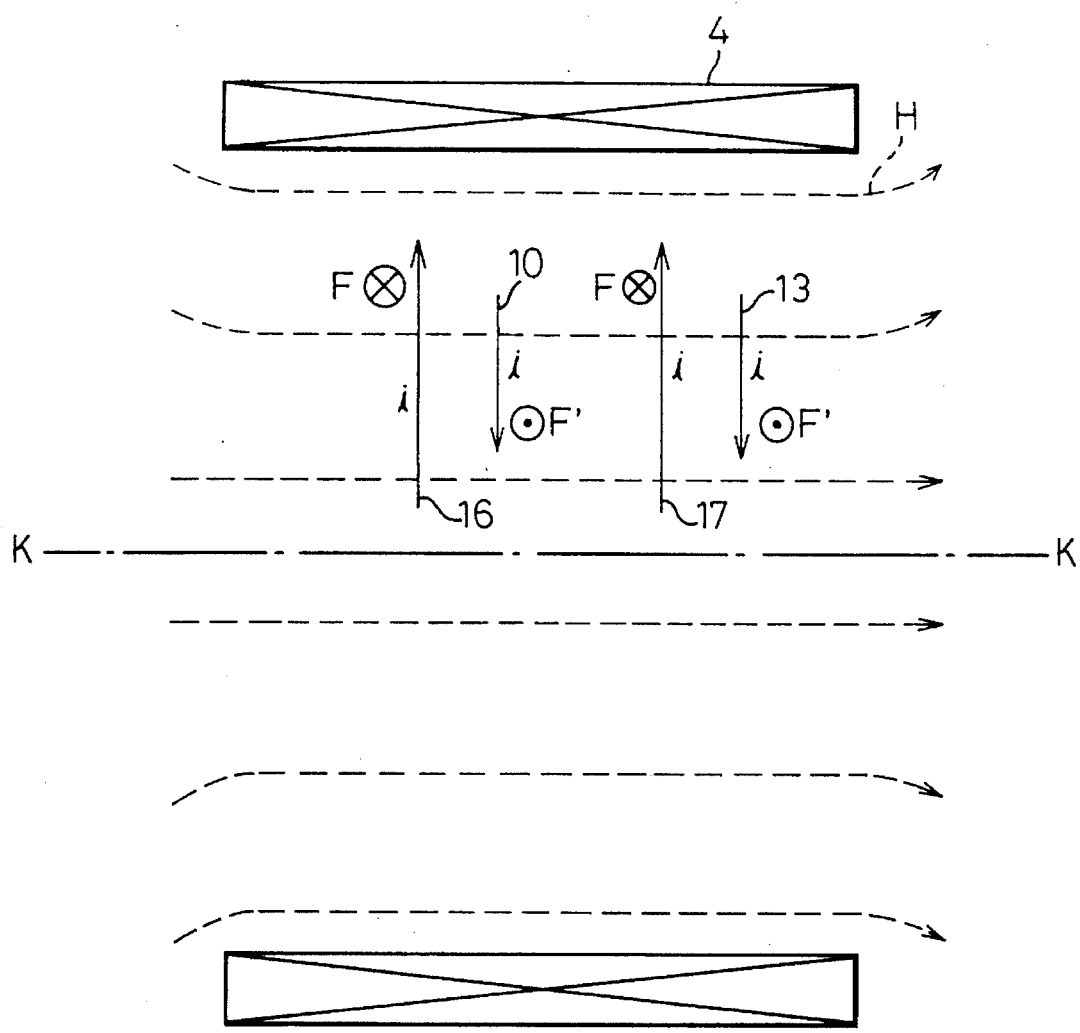
FIG. 3 is a view schematically illustrating an operation of the dynamoelectric machine shown in FIG. 1.
Figure 4:
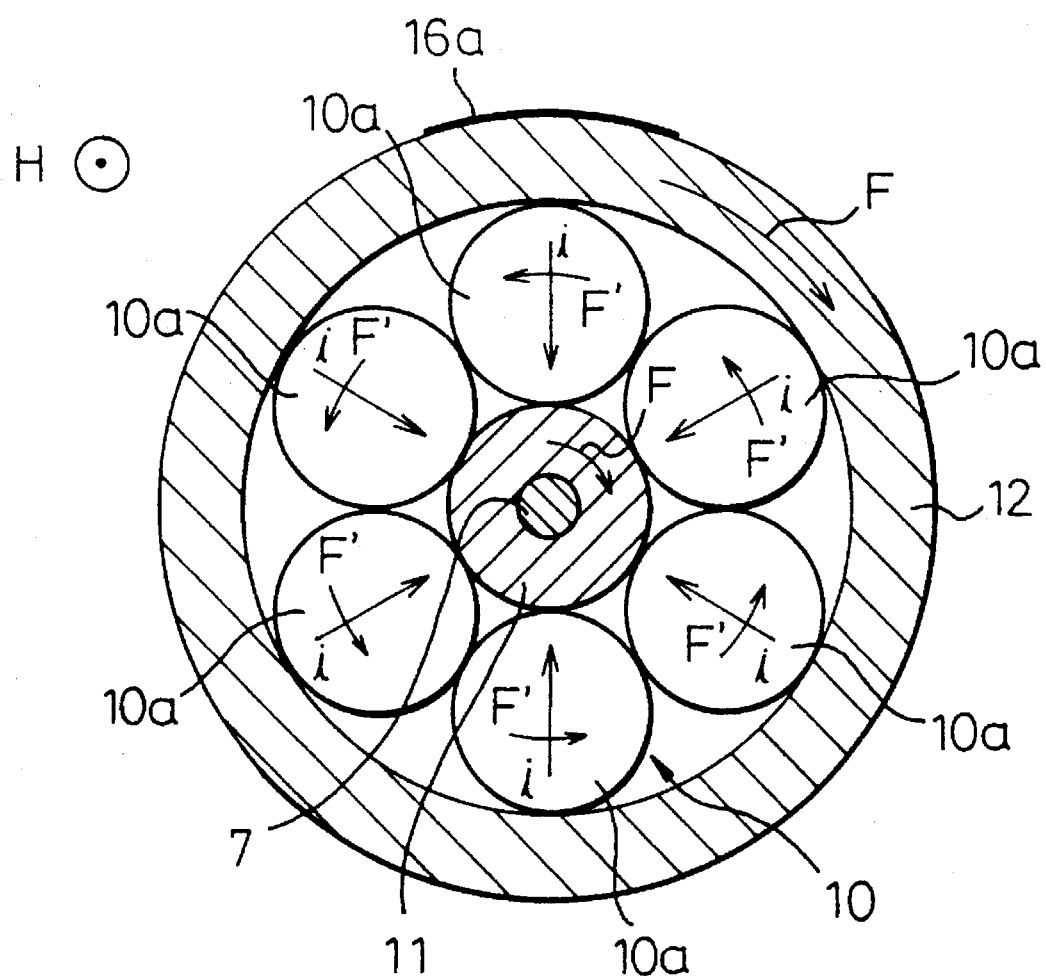
FIG. 4 is a cross-sectional view of the rotor, as shown in FIG. 2, schematically illustrating an operation of the dynamoelectric machine shown in FIG. 1.

Referring now to FIGS. 3 and 4, the operation of the motor 1 shown in FIG. 1 is described.

When a direct current is supplied to the solenoid coil 4, a magnetic field H, substantially parallel to the axis K—K as shown in FIG. 3, is generated within the cavity 6 of the coil 4. In this state, by supplying a direct current to the paths 16 and 17, and to the rotating bodies 10 and 13, the electric current i passes through the paths 16 and 17 from the proximal end to the distal end thereof. This current i passes through the magnetic field H, and generates Lorentz forces F in the circumferential direction of the plates 8 and 9 (that is, in FIG. 3, perpendicular to the paper, and from the front to the back of the paper) in the paths 16 and 17. On the other hand, at the same time, the current i passes through the rotating bodies 10 and 13 from the distal end to the proximal end thereof. The current i in the rotating bodies 10 and 13 passes through the magnetic field H and generates Lorentz forces F' in the circumferential direction of the plates 8 and 9. The direction of the Loreritz force F' is, however, opposite to that of the force F (that is, in FIG. 3, perpendicular to the paper, and from the back to the front of the paper).

The forces F cause the plates 8 and 9 rotate about the axis K—K. On the other hand, the forces F' cause the corresponding bodies 10 and 13 rotate about the axis K—K, in the opposite direction to that of the plates 8 and 9.

If the rotating bodies 10 and 13 are fixed to the plate 8 and 9, the Lorentz forces F and F' cancel each other, and thus the shaft 7 does not rotate.

However, in this embodiment, the rotating bodies 10 and 13 are not fixed to the corresponding plates 8 and 9, i.e., the bodies 10 and 13 are able to rotate about the axis K—K, under the influence of the Lorentz forces F', relative to the plates 8 and 9. Therefore, the shaft 7 is rotated about the axis K—K by the plates 8 and 9 due to the Lorentz forces F acting thereon.

The electric current passing through the axially extending paths 18, 16a, 18a, 17a, and 19 is substantially parallel to the magnetic field H, and thus the Loreritz force generated on these paths is substantially zero.

According to this embodiment, the rotating bodies 10 and 13, which constitute the second electric current path, are supported by the rotor. Therefore, a precise location of the rotating bodies 10 and 13 in the cavity 6 is not required, and thus the assembly of the motor 1 is easy, and the electrical connection between the first and second paths is ensured. Further, even though two paths 16 and 17 is provided for generating a rotating force of the shaft 7, only one pair of brushes 22 and 23 is required, and thus frictional loss at the shaft 7 is reduced. Furthermore, the brushes 22 and 23 can be arranged outside of the cavity 6, as shown, and, therefore, the volume of the space 6 can be made small. Accordingly, the entire motor 1 can be made smaller.

Figure 5:
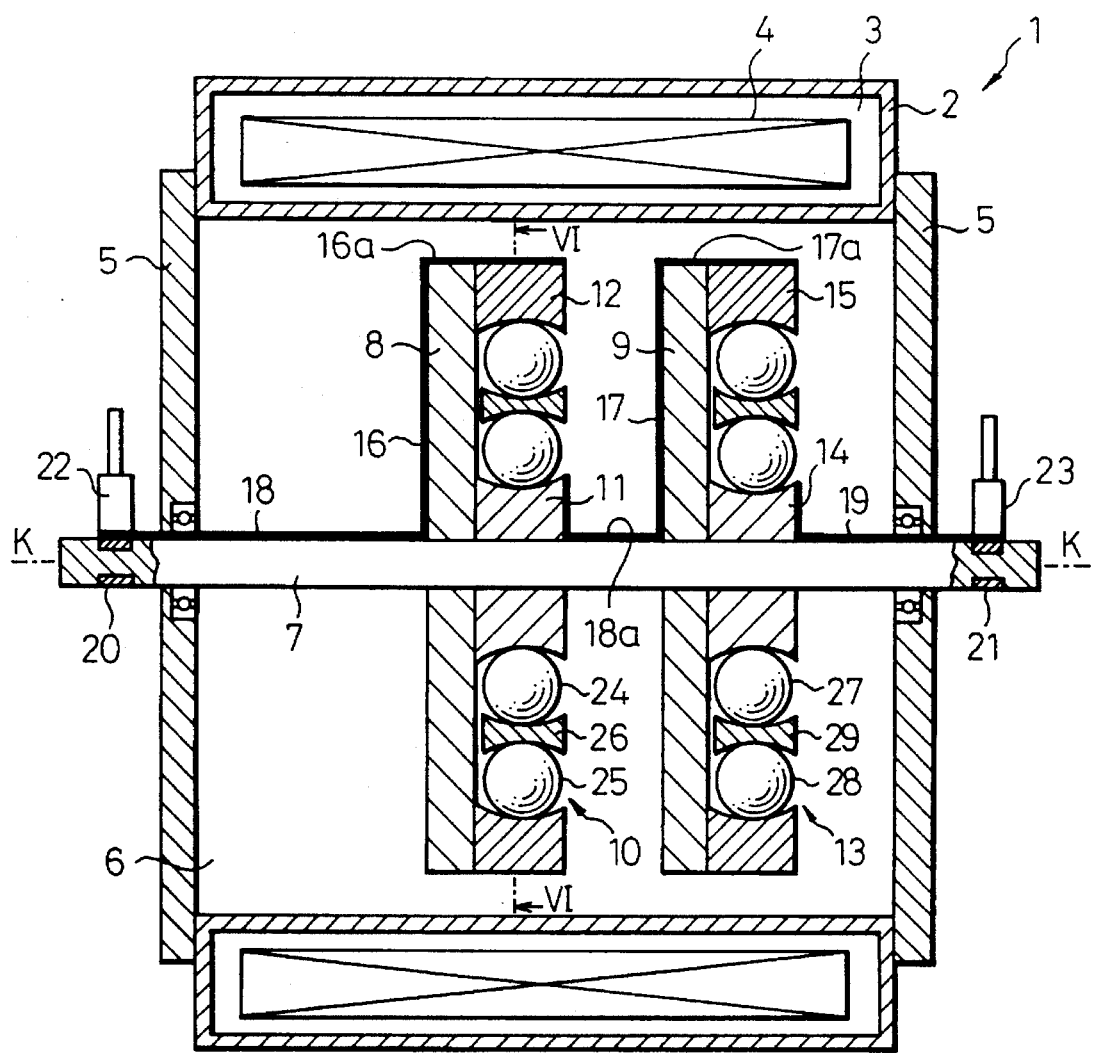
FIG. 5 is a cross-sectional side view of a homopolar dynamoelectric machine according to a second embodiment of the present invention.

FIG. 5 illustrates another embodiment of the present invention. In this embodiment, similar components are indicated with the same reference numerals as used in FIG. 1. Also, in this embodiment, the power supplies 4a and 22a illustrated in FIG. 1 are provided, but these supplies are not shown in FIG. 5.

Figure 6:
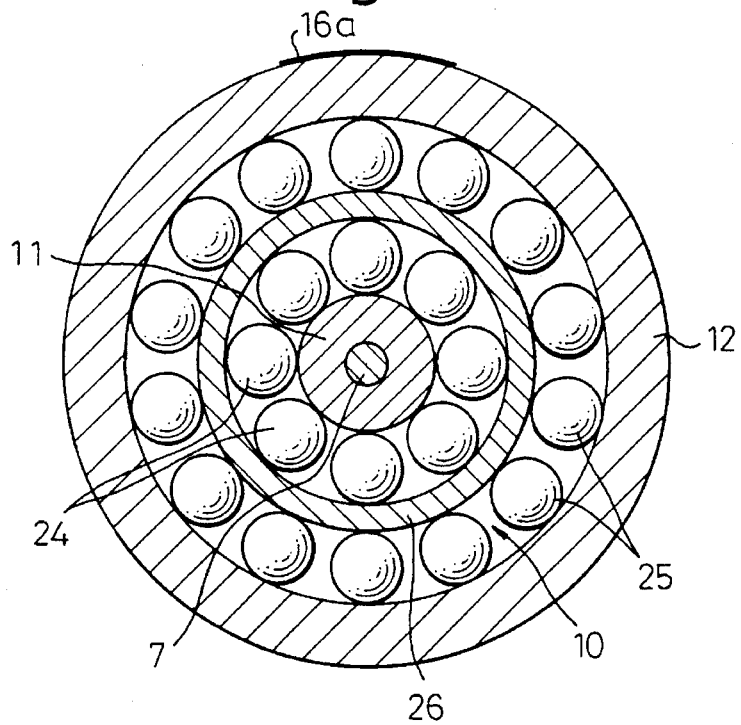
FIG. 6 is a cross-sectional view of a rotor, taken along the line VI—VI in FIG. 6.

Referring now to FIGS. 5 and 6, the plate 8 is provided with the rotating body 10 and the plate 9 is provided with the rotating body 13. In this embodiment, however, as shown in FIGS. 5 and 6, the rotating body 10, which constitutes a second path, comprises inside balls 24, outside balls 25, and an annular ring 26 inserted between these balls 24 and 25. The inside balls 24 are supported by the support 11 and the ring 26, and the outside balls 25 are supported by the ring 26 and the support 12. Accordingly, the balls 24 and 25, and the ring 26 are rotatably supported by the plate 8 about the axis K—K. In this embodiment, the balls 24, the ring 26, and the balls 25 are aligned in a plane substantially perpendicular to the axis K—K.

In the same manner, the rotating body 13, which also constitutes a second path, comprises inside balls 27, outside balls 28, and an annular ring 29 inserted between these balls 27 and 28. The inside balls 27 are supported by the support 14 and the ring 29, the outside balls 28 are supported by the ring 29 and the support 15. Accordingly, balls 27 and 28, and the ring 29 are rotatably supported by the plate 9 about the axis K—K. The balls 27, the ring 29, and the balls 28 are aligned in a plane substantially perpendicular to the axis K—K. Further, the balls 24, 25, 27, and 28, and rings 26 and 29 are formed of an electroconductive material such as a beryllium-copper alloy.

Figure 7:
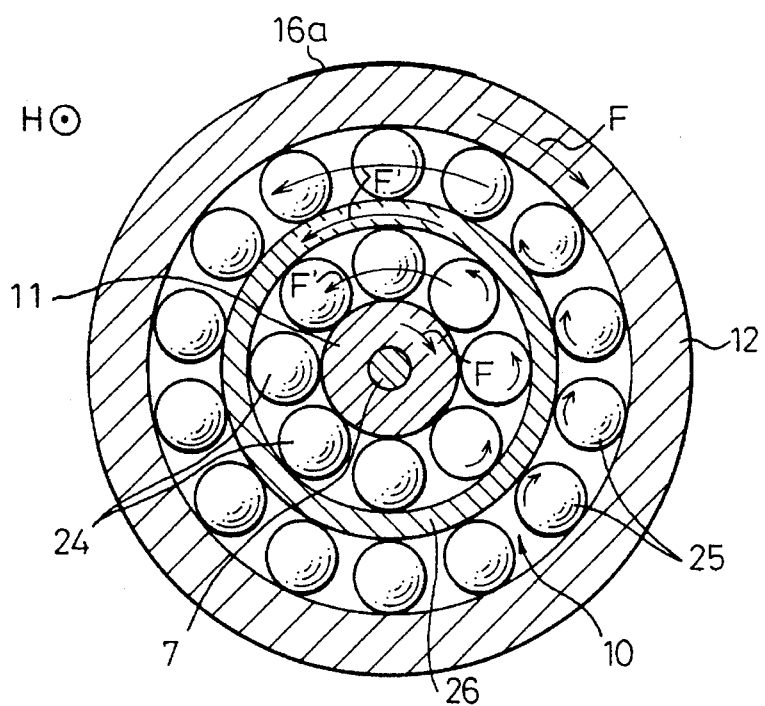
FIG. 7 is a sectional view of a rotor, as shown in FIG. 6, schematically illustrating an operation of the dynamoelectric machine shown in FIG. 5.

Referring now to FIG. 7, the operation of the motor 1 shown in FIG. 5 is described.

When direct current is supplied to the solenoid coil 4, the magnetic field H, substantially parallel to the axis K—K, is generated within the cavity 6 of the coil 4, as shown in FIG. 3. By supplying direct current to the electric current paths 16 and 17, and to the rotating bodies 10 and 13, the electric current i passes through the paths 16 and 17, respectively, from the proximal end to the distal end thereof. This current i passes through the magnetic field H, and thus Lorentz forces F directed in the circumferential direction of the plates 8 and 9 (that is, in FIG. 7, clockwise) act on the paths 16 and 17. These forces F are transferred to the plate 8 and 9, and thus the shaft 7 is rotated with the plates 8 and 9.

On the other hand, at the same time, the current i passes through the rotating bodies 10 and 13 from the distal end to the proximal end thereof. The current i also passes through the magnetic field H, and thus Lorentz forces F' directed in the circumferential direction of the plates 8 and 9, are generated. The directions of the Lorentz forces F' are, however, opposite to that of the forces F (that is, in FIG. 7, counter-clockwise).

The forces F cause the plate 8 and 9 rotate about the axis K—K. On the other hand, the forces F' cause the bodies 10 and 13 rotate about the axis K—K, in the opposite direction to that of the plates 8 and 9.

In this embodiment, the rotating bodies 10 and 13 are not integrally fixed to the corresponding plate 8 and 9, i.e., these bodies 10 and 13 are able to rotate about the axis K—K under the influence of the Lorentz forces F', relative to the plates 8 and 9. Therefore, the shaft 7 can rotate, about the axis K—K, under the influence of the Lorentz forces F acting on the plates 8 and 9.

Further, in this embodiment, while the shaft 7 rotates, the balls 24, 25, 27, and 28 may rotate about the respective axes thereof, as well as revolting about the axis K—K. Therefore, the fractional loss between the rotating bodies 10 and 13 and the corresponding supports 11 and 14, and between the rotating bodies 10 and 13 and the corresponding supports 12 and 15, is low. Accordingly, the output of the motor 1 is increased. The other structures and the operation of the motor 1 according to this embodiment are the same as those of the motor shown in FIG. 1, and thus any further description is omitted.

Figure 8:
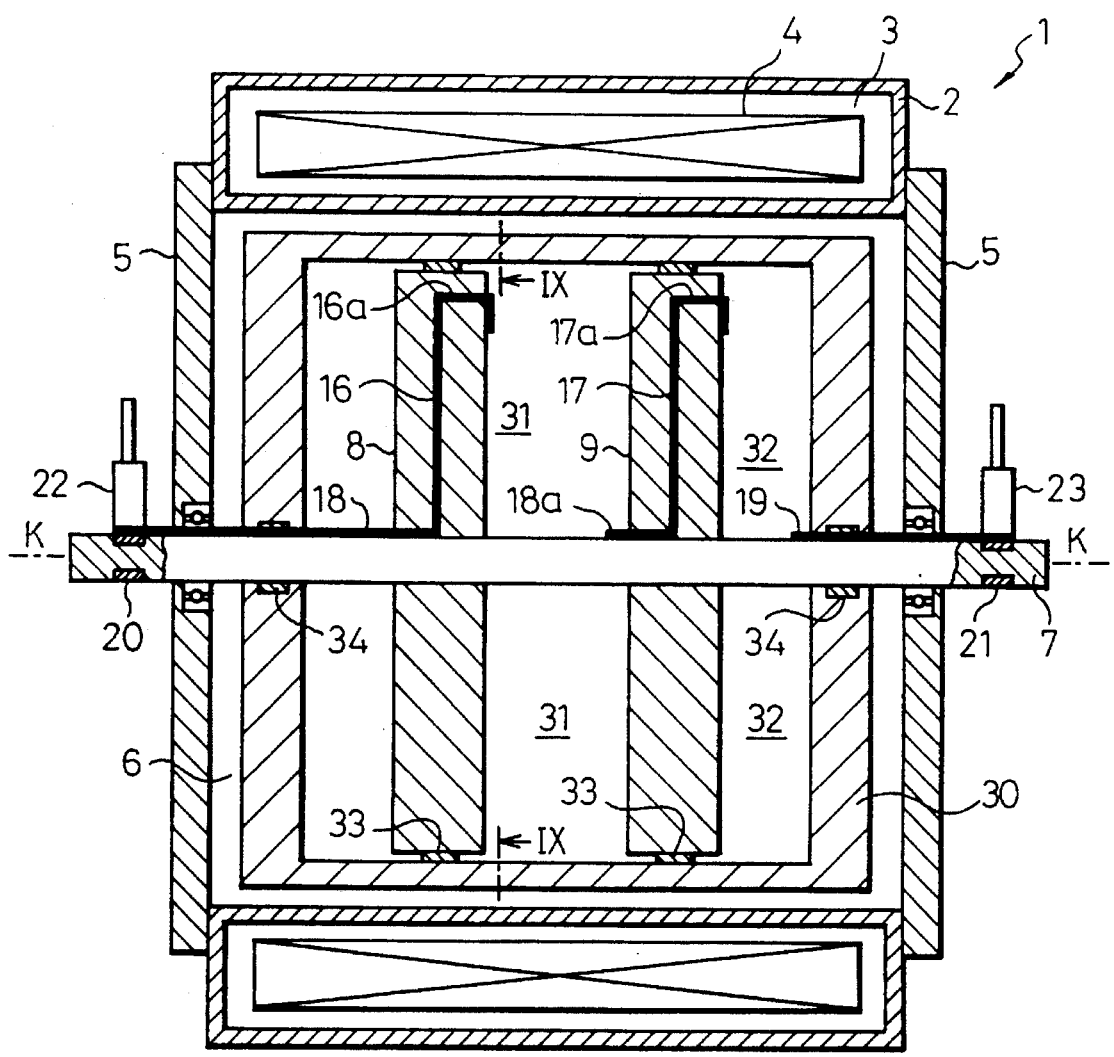
FIG. 8 is a cross-sectional side view of a homopolar dynamoelectric machine according to a third embodiment of the present invention.

FIG. 8 illustrates still another embodiment of the present invention. In this embodiment, similar components are indicated with the same reference numerals as used in FIG. 1. Also, in this embodiment, the power supplies 4a and 22a illustrated in FIG. 1 are provided but are not shown in FIG. 8.

Referring to FIG. 8, in the cavity 6, a cylindrical casing 30 is provided. The casing 30 accommodates the plates 8 and 9, and the shaft 7 passes through the casing 30. Further, the casing 30 is integrally fixed on the shaft 7, via annular seal members 34, which members are formed of an insulating material. Therefore, the casing 30 rotates with the shaft 7 about the axis K—K, and thus constitutes the rotor. In this embodiment, the casing 30 is formed of an insulating material, such as resin. Alternatively, the casing 30 may be formed of a steel provided with an insulating layer on the inside surface thereof.

As shown in FIG. 8, between the plates 8 and 9 and the casing 30, seal members 33 of an insulating material are inserted. Therefore, an annular, sealed space 31 is defined between the plates 8 and 9 and the casing 30. The sealed space 31 extends from the proximal portion to the distal portion of the rotor. Further, the sealed space 31 is filled with an electroconductive liquid, and thus the space 31 contains an electroconductive liquid volume. The liquid in the space 31 is, for example, a liquid metal, such as mercury, or ionic liquid, such as an aqueous sodium chloride solution. Also, between the plate 9 and the side plate of the casing 30, an annular sealed space 32, similar to the space 31, is defined and filled with an electroconductive liquid. The sealed space 32 also forms an electroconductive liquid volume. Since, as described above, the casing 30 constitutes the rotor, the volumes 31 and 32 are supported by the rotor.

Figure 9:
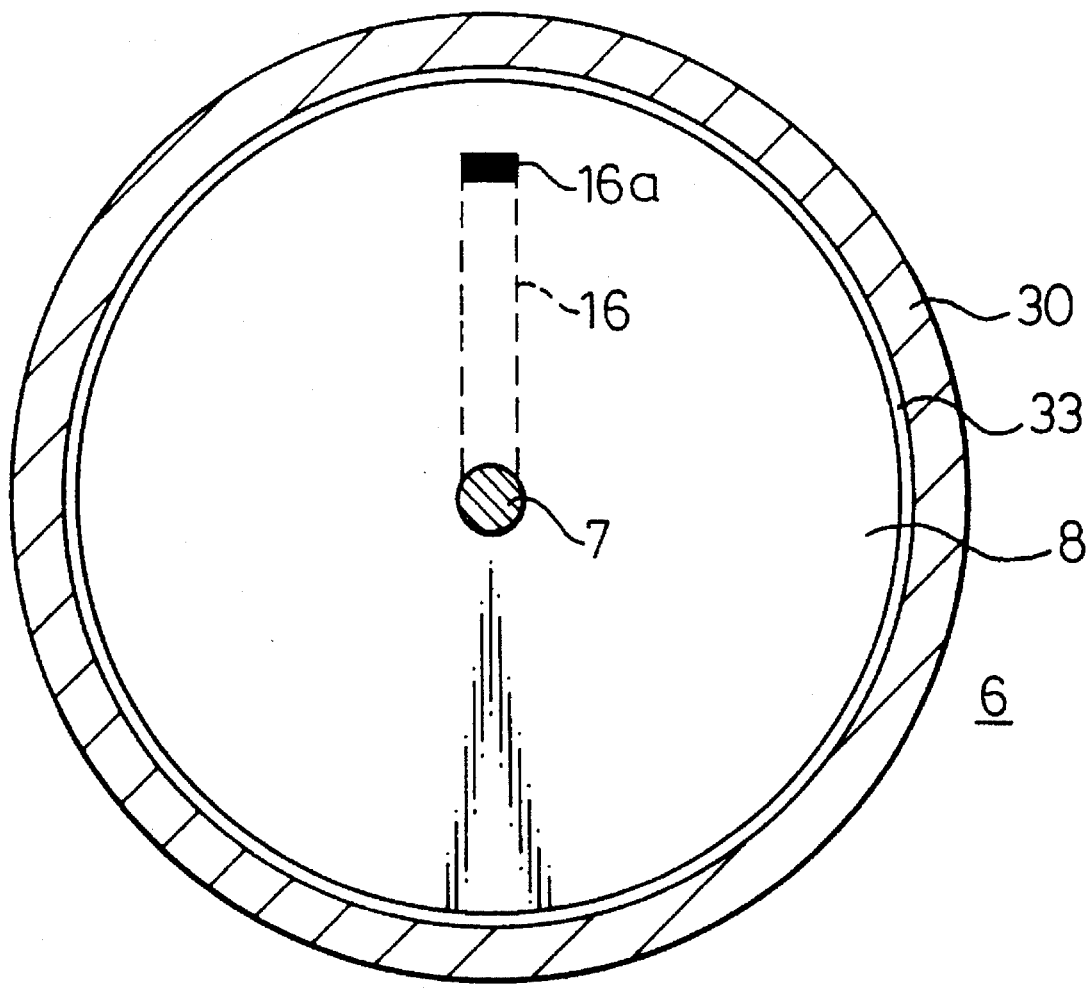
FIG. 9 is a cross-sectional view of a rotor, taken along the line IX—IX in FIG. 8.

As shown in FIGS. 8 and 9, the electric current path 16, which extends from the proximal end to the distal end thereof, runs through the plate 8, in order to insulate it from the liquid in the volumes 31 and 32. The path 16 constitutes a first electric current path. The distal end of the path 16 is electrically connected to the distal portion of the volume 31, via the axially extending path 16a. The distal end, which is connected to the volume 31, of the axially extending path 16a extends outside of the plate 8, and is exposed to the volume 31. Therefore, this end is in electrical contact with the liquid in the volume 31. In the embodiment shown, the liquid volume 31 constitutes a second electric current path, and thus the first and second paths 16 and 31 are connected in series.

As in the same manner, the electric current path 17 runs through the plate 9, in order to insulate it from the liquid in the volumes 31 and 32. The path 17 constitutes a first electric current path. The distal end of the path 17 is electrically connected to the distal portion of the liquid volume 32, via the axially extending path 17a. The distal end, which is connected to the volume 32, of the axially extending path 17a extends outside of the plate 9, and is exposed to the volume 32. Therefore, this end is in electrical contact with the liquid in the volume 32. The volume 32 also constitutes a second electric current path, and thus the first and second paths 17 and 32 are connected in series.

The proximal end of the path 16 is electrically connected to the slip ring 20, via the axially extending path 18. The proximal end of the path 17 is electrically connected to the proximal portion of the liquid volume 31, via the axially extending path 18a. Therefore, the pair of the paths 16 and 31, and the pair of the paths 17 and 32 are connected in series. The proximal portion of the volume 32 is electrically connected to the slip ring 21, via the axially extending path 19.

Figure 10:
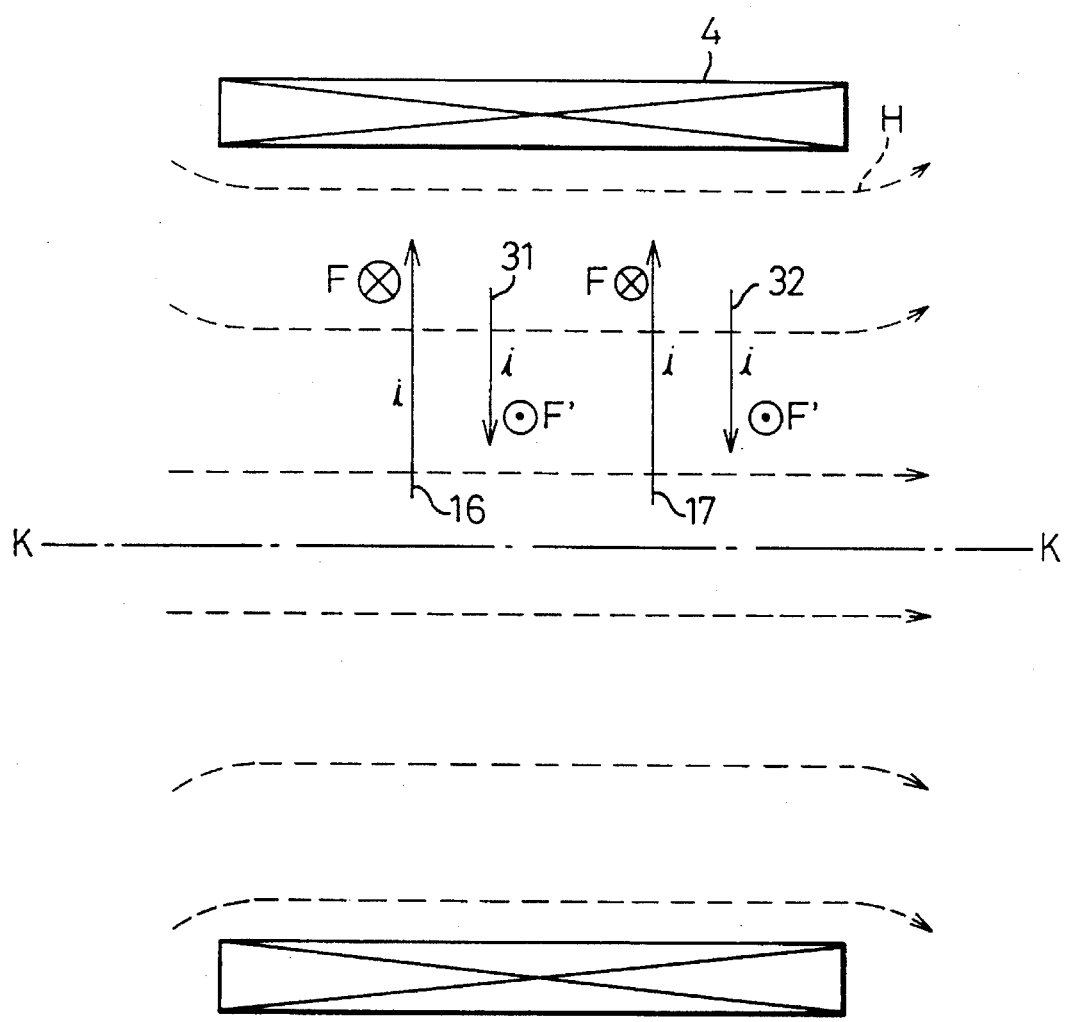
FIG. 10 is a view schematically illustrating an operation of the dynamoelectric machine shown in FIG. 8.
Figure 11:
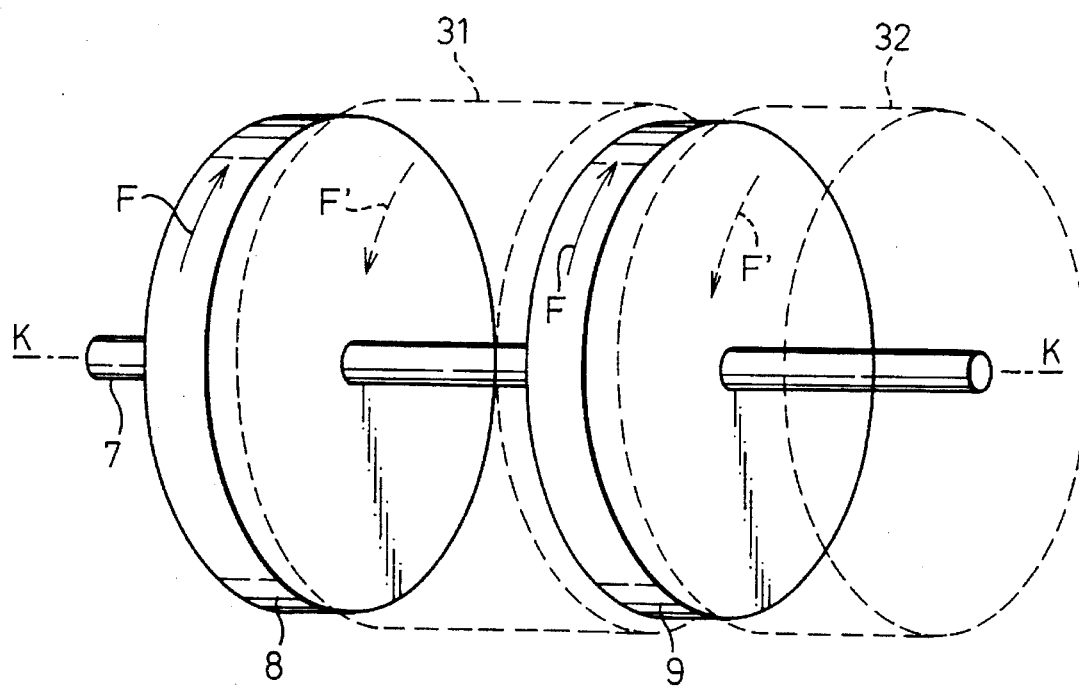
FIG. 11 is a partial perspective view of a rotor, schematically illustrating an operation of the dynamoelectric machine shown in FIG. 8.

Referring now to FIGS. 10 and 11, the operation of the motor 1 shown in FIG. 8 is described.

When direct current is supplied to the solenoid coil 4, a magnetic field H, substantially parallel to the axis K—K as shown in FIG. 10, is generated within the cavity 6 in the coil 4. In this state, by supplying direct current to the electric current paths 16 and 17, and to the liquid volumes 31 and 32, an electric current i passes through the paths 16 and 17 from the proximal end to the distal end thereof. This current i passes through the magnetic field H, and thus Lorentz forces F directed in the circumferential direction of the plates 8 and 9, are generated on the paths 16 and 17. At the same time, the current i passes through the volumes 31 and 32 from the distal portion to the proximal portion thereof. The current i also passes through the magnetic field H, and thus Loreritz forces F' directed in the circumferential direction of the plates 8 and 9, are generated. The directions of the Lorentz forces F' are, however, opposite to those of the forces F.

The forces F cause the plates 8 and 9 rotate about the axis K—K. On the other hand, the forces F' cause liquid in the volumes 31 and 32 rotate, about the axis K—K, in a direction opposite to that of the plates 8 and 9.

In this embodiment, the liquid in the volumes 31 and 32 is rotated about the axis K—K, by the Loreritz forces F', relative to the plates 8 and 9. Therefore, the shaft 7 is rotated about the axis K—K, by the plates 8 and 9, due to the Lorentz forces F acting thereon.

According to this embodiment, the liquid volumes 31 and 32, which constitute the second electric current path, are supported by the rotor. Therefore, a precise location of the volumes 31 and 32 in the cavity 6 is not required, and thus the assembly of the motor 1 is made simple and a good electrical connection between the first and second paths is ensured. Further, the frictional loss between the plates 8 and 9 and the liquid in the volumes 31 and 32 is relatively small, and thus the output of the motor 1 is increased. Furthermore, the plates 8 and 9 rotate integrally with the casing 30, that is, the plates 8 and 9 do not move relative to the casing 30 while rotating, and thus the structure of the seal members 33, between the plates and the casing 30, is simple.

In the embodiments described above, the brush 22 is connected to the positive terminal of the power supply 22a, and the brush 23 is connected to the negative terminal of the power supply 22a. Alternatively, the brush 22 may be connected to the negative terminal, and the brush 23 may be connected to the positive terminal. In this case, the paths 16 and 17 constitute the second path, through which the electric current passes from the distal portion to the proximal portion of the rotor, and the rotating bodies 10 and 13 and/or the liquid volume 31 and 32 constitute the first path, through which the electric current passes from the proximal portion to the distal portion of the rotor.

According to the present invention, it is possible to easily assemble a homopolar dynamoelectric machine, and to make the structure of the dynamoelectric machine simpler, while ensuring a good electrical connection between the first and second paths.

While the invention has been described by reference to specific embodiments chosen for purposes of illustration, it should be apparent that numerous modifications could be made thereto by those skilled in the art without departing from the basic concept and scope of the invention.

We claim:

1. A homopolar dynamoelectric machine comprising:

a solenoid coil for excitation, a cylindrical cavity formed around an axis thereof;

a rotor, provided in the cavity, rotatable about the axis of the coil, having a proximal portion and a distal portion;

a rotating body, rotatably supported by the rotor about an axis of the rotor, the rotatable body extending from the proximal portion to the distal portion of the rotor;

a first electric current path extending from the proximal portion to the distal portion of the rotor, through which an electric current passes from the proximal portion to the distal portion of the rotor; and a second electric current path extending from the distal portion to the proximal portion of the rotor, through which an electric current passes from the distal portion to the proximal portion of the rotor, the second electric current path being electrically connected in series with the first electric current path, and the first and second electric current paths being adapted to be electrically connected to a power supply in order to supply a direct current to the first and second electric current paths;

wherein the rotor comprises one of the first and second electric current paths, and the rotating body comprises the other of the first and second electric current paths.

2. A homopolar dynamoelectric machine according to claim 1, wherein the rotor comprises a rotating shaft positioned on the axis of the coil rotatably about the axis; and a generally circular plate integrally provided on the shaft.

3. A homopolar dynamoelectric machine according to claim 1, wherein the rotor further comprises two annular supports integrally fixed to the rotor for supporting the rotating body, one of the supports being positioned at the proximal portion of the rotor, and the other being at the distal portion of the rotor, and wherein the rotating body is positioned between the supports.

4. A homopolar dynamoelectric machine according to claim 3, wherein the rotating body comprises at least one rotating member, in the form of a plate, extending from the proximal support to the distal support.

5. A homopolar dynamoelectric machine according to claim 3, wherein the rotating body comprises a first group of rotating members arranged along the proximal support; a second group of rotating members arranged along the distal support; and a ring arranged between the first and second groups of the members, for supporting the rotating members, the ring being rotatable, relative to the rotating members, about the axis of the rotor.

6. A homopolar dynamoelectric machine according to claim 5, wherein the each of the rotating members is in the form of a ball.

7. A homopolar dynamoelectric machine according to claim 3, wherein the rotating body is formed of an electroconductive material so that the rotating body itself forms one of the first and second electric current paths, the supports are also formed of an electroconductive material, and the other of the first and second electric current paths which is in the rotor has an end which is electrically connected to the one of the supports, and wherein the rotating body contacts with the supports so as to obtain an electrical connection between the rotor and the rotating body.

8. A homopolar dynamoelectric machine according to claim 7, wherein the electroconductive material is a copper-beryllium alloy.

9. A homopolar dynamoelectric machine according to claim 1, wherein the rotating body comprises an electroconductive liquid volume formed in the rotor.

10. A homopolar dynamoelectric machine according to claim 9, wherein the electroconductive liquid volume comprises a sealed space filled with an electroconductive liquid, the sealed space extending from a proximal portion to a distal portion of the rotor.

11. A homopolar dynamoelectric machine according to claim 10, wherein the electroconductive liquid is one of a liquid metal and an ionic liquid.

12. A homopolar dynamoelectric machine according to claim 10, wherein the rotor comprises a cylindrical casing accommodating the rotor, which is within the cylindrical cavity, therein, the sealed space being formed between the casing and the rotor.

13. A homopolar dynamoelectric machine according to claim 12, wherein the casing is integrally fixed on the rotor so that a relative rotation between the rotor and the casing is prevented.

14. A homopolar dynamoelectric machine according to claim 1, wherein the rotor is formed of an insulating material, and wherein one of the first and second electric current paths, which is provided in the rotor, is formed by a tape or a strip of an electroconductive material, and is integrally attached to the rotor.

15. A homopolar dynamoelectric machine according to claim 1, wherein at least one of the first and second electric current paths extends substantially perpendicular to the axis of the coil.

16. A homopolar dynamoelectric machine according to claim 1, wherein the first and second electric current paths are electrically connected at the distal portion of the rotor.

17. A homopolar dynamoelectric machine according to claim 1, wherein the dynamoelectric machine further comprises a pair of collecting brushes, one of the brushes being adapted to be electrically connected to the power supply, and the other of the brushes being adapted to be electrically connected to the power supply; and a pair of slip rings, the slip rings being provided on both ends of the rotor, and one of the slip rings being electrically connected to the end of the first electric current path, and the other of the slip rings being electrically connected to the end of the second electric current path, and wherein the brushes respectively engage with a separate one of the slip rings so as to obtain an electrical connection between the power supply and the first and second electric current paths.

18. A homopolar dynamoelectric machine according to claim 17, wherein the brushes and the slip rings are positioned outside of the cavity.

19. A homopolar dynamoelectric machine according to claim 1, wherein the dynamoelectric machine comprises at least one additional first electric current path extending from the proximal portion to the distal portion of the rotor; at least one additional second electric current path extending from the distal portion to the proximal portion of the rotor, and electrically connected in series with the one additional first electric current path; and at least one additional rotating body rotatably supported by the rotor about the axis of the rotor, wherein the rotor comprises one of the additional first and additional second electric current paths, and the additional rotating body comprises the other of the additional first and additional second electric current paths.

20. A homopolar dynamoelectric machine according to claim 19, wherein the first and second electric current paths and the additional first and second paths are electrically connected in series.

* * * * *